United States Patent
Mountain et al.

(10) Patent No.: US 7,587,712 B2
(45) Date of Patent: Sep. 8, 2009

(54) END-TO-END ARCHITECTURE FOR MOBILE CLIENT JIT PROCESSING ON NETWORK INFRASTRUCTURE TRUSTED SERVERS

(75) Inventors: Highland Mary Mountain, Gilbert, AZ (US); Zafer Kadi, Tempe, AZ (US); Murthi Nanja, Portland, OR (US)

(73) Assignee: Marvell International Ltd. (BM)

( * ) Notice: Subject to any disclaimer, the term of this patent is extended or adjusted under 35 U.S.C. 154(b) by 917 days.

(21) Appl. No.: 10/742,728

(22) Filed: Dec. 19, 2003

(65) Prior Publication Data

US 2005/0136939 A1   Jun. 23, 2005

(51) Int. Cl.
*G06F 9/45* (2006.01)
(52) U.S. Cl. .............. 717/148; 709/203; 709/246; 717/146
(58) Field of Classification Search ............ 717/148
See application file for complete search history.

(56) References Cited

U.S. PATENT DOCUMENTS

| | | | |
|---|---|---|---|
| 6,370,687 B1 * | 4/2002 | Shimura | 717/146 |
| 6,810,245 B1 * | 10/2004 | Hinds et al. | 455/418 |
| 6,895,425 B1 * | 5/2005 | Kadyk et al. | 709/203 |
| 7,032,015 B1 * | 4/2006 | Delandro et al. | 709/222 |
| 7,080,159 B2 * | 7/2006 | Chu et al. | 709/246 |
| 7,100,172 B2 * | 8/2006 | Voellm et al. | 719/332 |
| 7,136,880 B2 * | 11/2006 | Wilkins et al. | 707/203 |
| 7,174,544 B2 * | 2/2007 | Zee | 717/148 |
| 2002/0131404 A1 * | 9/2002 | Mehta et al. | 370/352 |
| 2003/0005425 A1 * | 1/2003 | Zee | 717/166 |
| 2003/0177480 A1 * | 9/2003 | Arkwright et al. | 717/148 |
| 2004/0103407 A1 * | 5/2004 | Blaukopf et al. | 717/140 |

FOREIGN PATENT DOCUMENTS

WO   WO 03/038616 A2 *   5/2003

OTHER PUBLICATIONS

Alan Messer, Ira Greenberg, Philippe Bernadat, Dejan Milojicic, Dequing Chen, T.J. Giuli, Xiaohui Gu "Towards a Distributed Platform for Resource-Constrained Devices" Nov. 5, 2001.*

* cited by examiner

*Primary Examiner*—Phillip H. Nguyen
(74) *Attorney, Agent, or Firm*—Brinks Hofer Gilson & Lione

(57) ABSTRACT

A method for off loading resource intensive compilations is disclosed. The method may include enabling a user of a wireless handheld device to request a platform independent application. The wireless handheld device may be enabled to assess a resource on the wireless handheld device and to determine whether to request native code for the platform independent application. The method may also include enabling the requested platform independent application to be routed to a trusted server. The trusted server may compile the platform independent application into native code for the wireless handheld device and may transport the native code to the wireless handheld device for execution.

52 Claims, 9 Drawing Sheets

END-TO-END ARCHITECTURE FOR MOBILE CLIENT JIT PROCESSING ON NETWORK INFRASTRUCTURE TRUSTED SERVERS

FIELD OF THE INVENTION

The present invention is generally related to mobile technology. More particularly, the present invention is related to methods for offloading resource intensive compilations of byte code from resource constrained devices, such as handheld and wireless devices.

DESCRIPTION

Wireless data communication is one of the fastest growing areas in the communications industry today. It is becoming increasingly popular in the wireless data market as it can deliver data and applications over wireless networks. For example, wireless data communication can provide wireless data service subscribers with up-to-date information for stocks, weather, news, sports, etc. In addition, wireless subscribers can download and execute applications on their devices.

The types of resources available on wireless devices vary widely. Such resources include, but are not limited to, static and dynamic memory, processing power, display size, battery life, and input/output capabilities. In addition to cellular wireless connectivity, most of the resource constrained wireless devices of today often support other types of wireless connectivity, such as, but not limited to, Bluetooth and 802.11b wireless LAN (local area network).

The trend of mobile applications moving to runtime environments is well underway with runtime gaining momentum for the future as system and application software derive significant value from runtime environments. As a result, most of today's applications are being written in platform independent languages, such as, but not limited to, JAVA™ and C#.

Unlike statically compiled and statically linked native code environments, platform independent code is statically compiled to generate bytecode or intermediate language (IL) code binary. This intermediate language code is then loaded into memory by the runtime environment, such as, for example, J2ME JAVA™ 2 Platform, Micro Edition) and CLR (Common Language Runtime), and compiled by a JIT (Just-In-Time) compiler at load time to generate native (machine) code for the system on which it is running. The JIT compiler is a code generator that converts bytecode or IL code into target machine instructions. The resulting native code from the JIT compiler is finally executed on the target system. The JIT compiler is an integral part of the runtime environment and it determines the quality of generated native code and its execution performance. The JIT compilation process may represent a large part of the overall application execution time.

The JIT compiler's code generation performance is critical for the overall performance of the platform independent application code. Various optimization levels used by the JIT compiler often determine the performance of the JIT compiler. This is especially true for resource constrained wireless devices.

Thus, what is needed is a method for downloading and running platform independent code more efficiently in mobile runtime environments. What is also needed is a method that intelligently and dynamically determines the resource constraints on the wireless device, such as, for example, available dynamic memory for applications, processing load on the wireless device, and available network bandwidth, and provides a method for downloading and running platform independent code more efficiently in mobile runtime environments.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrases "in one embodiment" or "in an embodiment" appearing in various places throughout the specification are not necessarily all referring to the same embodiment.

Embodiments of the present invention are directed to methods for offloading compute intensive processing of runtime applications from a resource constrained wireless device to a more tooled device, such as, for example, a trusted server, a desktop computer, or other computing device capable of providing JIT compilations. Once the JIT compilation is performed, the resulting native code is transported to the wireless device for execution on the wireless device. In one embodiment, the native code is sent to the wireless device when needed using RDMA/SOAP (Remote Direct Memory Access/Simple Object Access Protocol). The data may be transported to the resource constrained devices using USB (Universal Serial Bus), IrDA (Infrared Data Association), Bluetooth, 802.11b, 2.5G/3G wide area networks, all of which are well known to those skilled in the relevant art(s).

Figure 1:
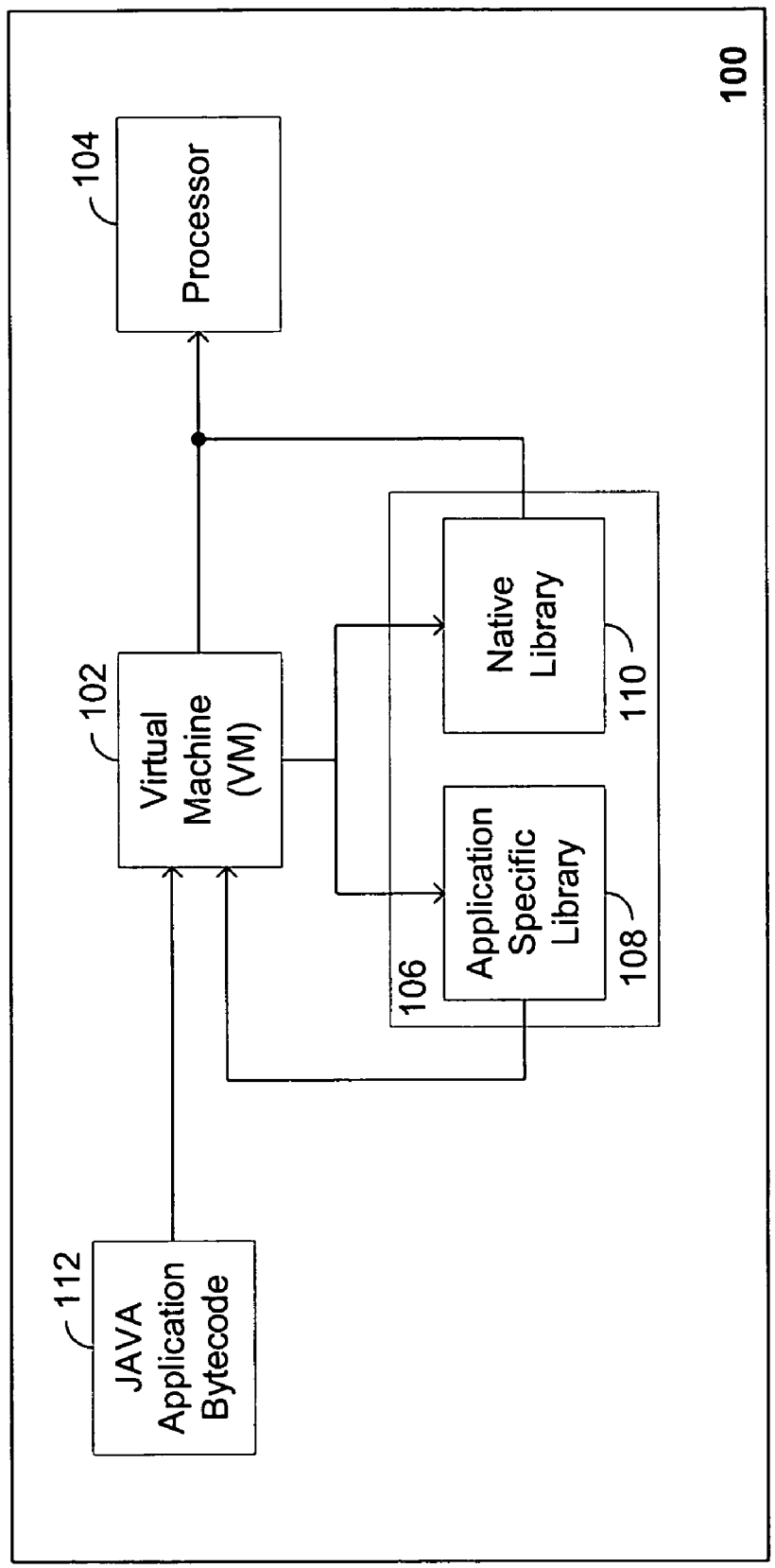
FIG. 1 is a block diagram illustrating a conventional wireless handheld device in which runtime applications are compiled and executed.

FIG. 1 is a block diagram illustrating a conventional wireless handheld device 100 in which runtime applications are compiled and executed. Handheld device 100 comprises a virtual machine 102, a processor 104, and libraries 106. Libraries 106 include an application specific library 108 and a native library 110. Virtual machine 102 is coupled to processor 104 and to libraries 106. Application specific library 108 is coupled to virtual machine 102 and native library 110 is coupled to processor 104.

Virtual machine 102 accepts as input JAVA™ applications 112. In one embodiment, JAVA™ applications 112 are received by handheld device 100 from service providers on the Internet or other well known sources. JAVA™ applications may make use of application specific library 108. The application bytecode or intermediate code is then compiled into native code on virtual machine 102. The native code is immediately executed by processor 104. In this embodiment, virtual machine 102 may include an interpreter rather than a JIT compiler. Interpreters often provide relatively poor execution performance for such applications on the handheld wireless device. As previously indicated, this method is very resource intensive, and can result in noticeable lag times for the user of wireless device 100.

Figure 2:
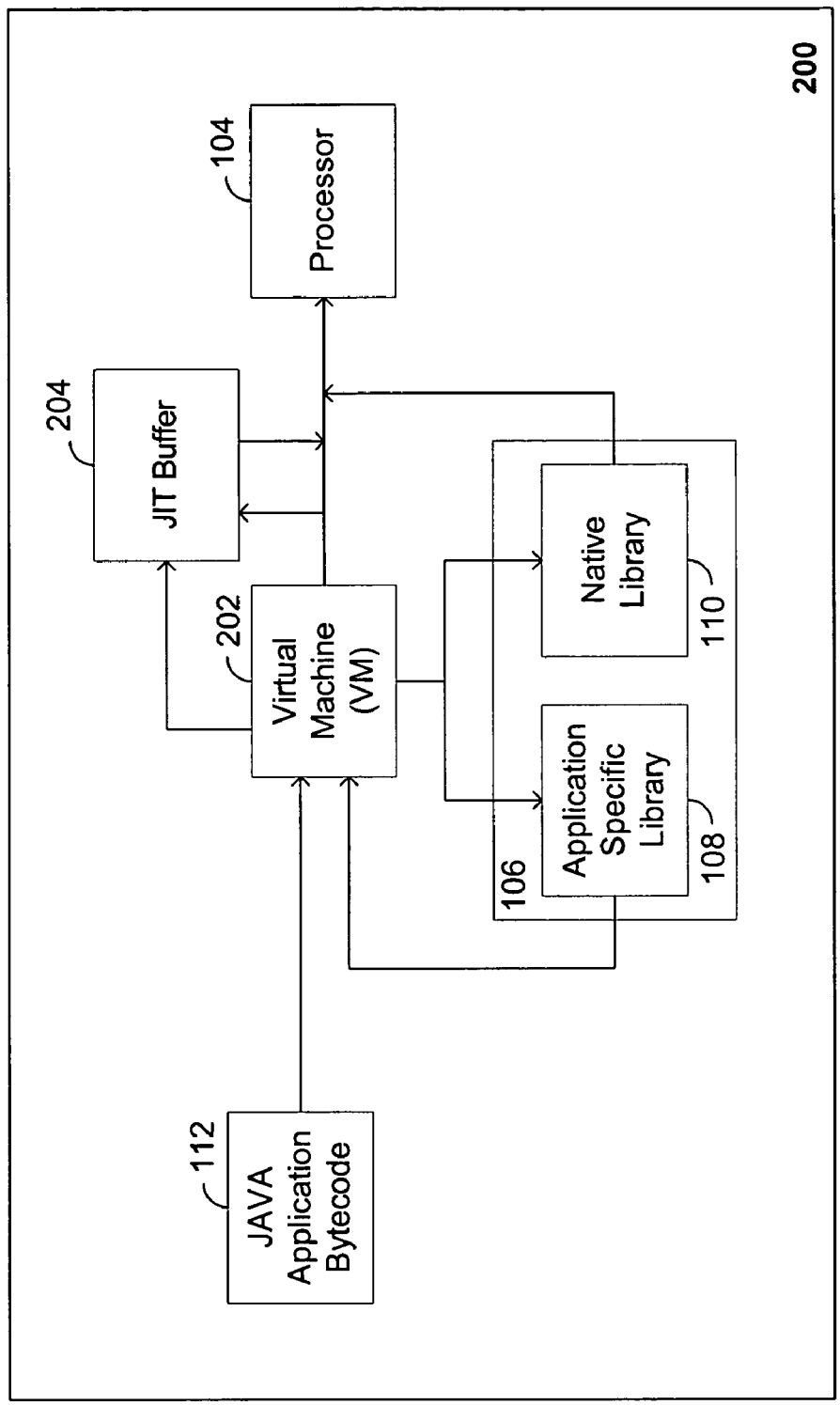
FIG. 2 is a block diagram illustrating another conventional wireless handheld device in which runtime applications are compiled and executed.

To increase the speed (or lessen the lag time), JIT compilers are integrated into wireless handheld devices. FIG. 2 is a block diagram illustrating another conventional wireless handheld device 200, incorporating a JIT compiler, in which runtime applications are compiled and executed. Handheld device 200 comprises a virtual machine 202 which includes a JIT compiler (not shown), a JIT buffer 204, processor 104, and libraries 106. Virtual machine 202 is coupled to JIT buffer 204, processor 104 and to libraries 106. JIT buffer 204 is coupled to virtual machine 202, processor 104 and native library 110. Application specific library 108 is coupled to virtual machine 102 and native library 110 is coupled to processor 104.

With conventional handheld device 200, which incorporates the JIT compiler within virtual machine 202, the JIT compiler is used to compile the bytecode or intermediate code. Although the JIT compilation improves, handheld device 200 required additional resources, such as static and dynamic memory, processor power, etc. to run the JIT compiler and then execute the native executable code. Thus, the JIT compiler may only be used when the processor of the handheld device has sufficient processing headroom and dynamic memory.

Figure 3:
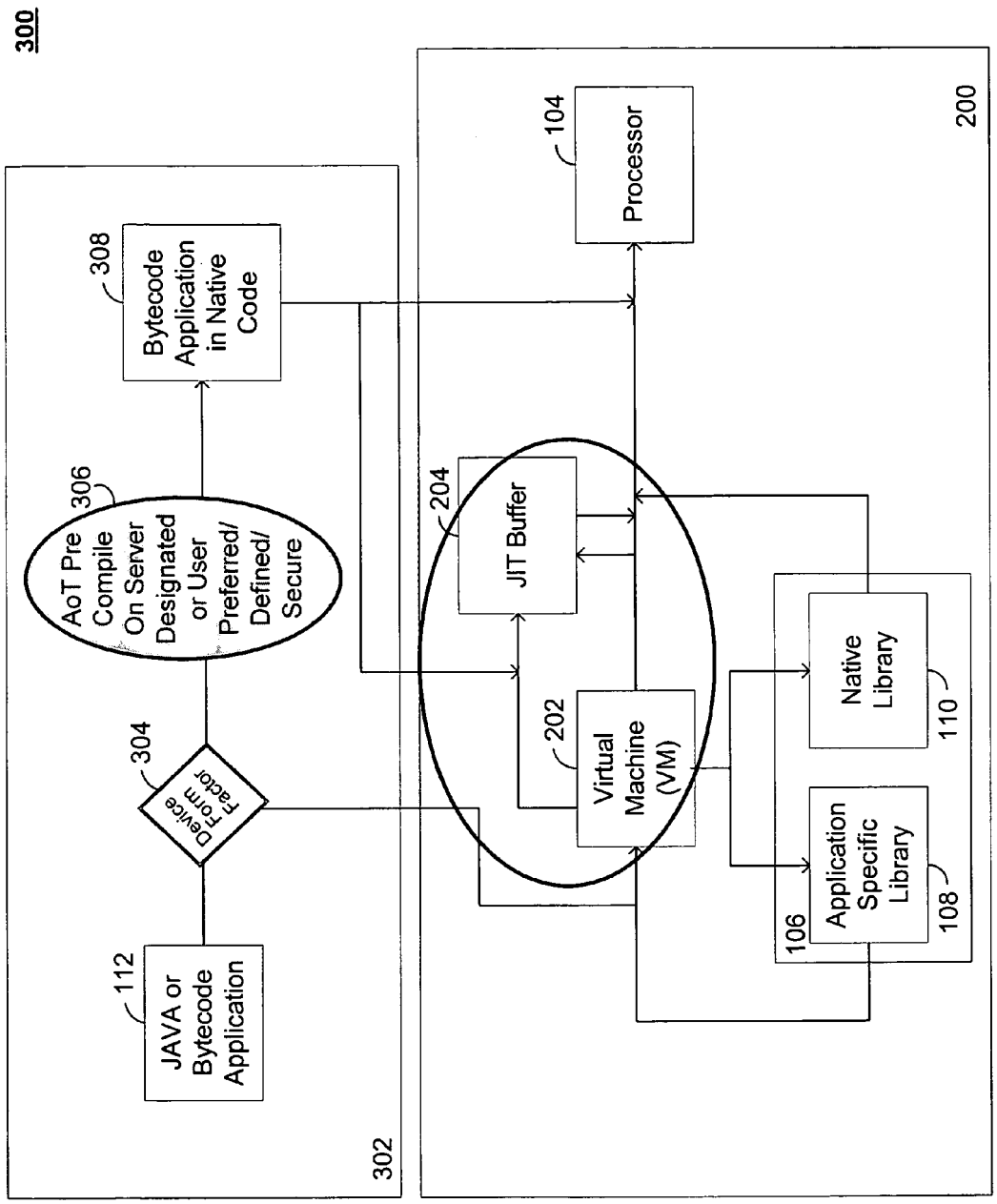
FIG. 3 is a diagram illustrating an exemplary mechanism for offloading resource intensive compiling of bytecode from a handheld wireless device according to an embodiment of the present invention.

Embodiments of the present invention solve the problem of limited resources in wireless handheld devices by having the resource intensive compilation of the bytecode take place on a separate device, such as, for example, a trusted server infrastructure utilizing transaction and caching mechanisms, and transporting the resultant native executable code to the handheld device for execution. This enables the handheld device to utilize byte-code applications (e.g., JAVA™ C#, etc.) in a dynamic, real-time fashion. FIG. 3 is a diagram illustrating an exemplary mechanism 300 for offloading resource intensive compiling of bytecode from a wireless device according to an embodiment of the present invention. Mechanism 300 comprises handheld device 200 coupled to a trusted server 302. All information for handheld device 200 is routed through trusted server 302. Sending the information for handheld device 200 through trusted server 302 is a built-in feature of the service provider used by the handheld device 200.

Trusted server 302 comprises, inter alia, a Just-In-Time (JIT) compiler (not explicitly shown) with Ahead-of-Time (AoT) compilation for performing a JIT process 306. JIT process 306 compiles any JAVA™ objects or bytecode applications 112 received by trusted server 302. JAVA™ objects or byte code applications 112 may be sent from XML (eXtensible Markup Language) or HTML (Hypertext Markup Language) servers on the World Wide Web or some other server or service provider on the Internet. The JAVA™ application or byte code is combined with a device form factor 304. Device form factor 304 includes characteristics of handheld device 200, such as a device profile, and user preferences of a user of handheld device 200, which are obtained when handheld device 200 is registered with trusted server 302. JIT process 306 takes into account security issues (i.e., viruses, codecs, and other security issues), device and user preferences from device form factor 304, and compiles the bytecode into native executable code 308 that is suitable for execution on handheld device 200. Converting the native executable code for handheld device 200 tailors the native executable code 308 for execution on handheld device 200. Native executable code 308 is then transported to handheld device 200 for execution via an RDMA/SOAP transport mechanism, which is described below with reference to FIG. 5. Native executable code 308 may be sent directly to processor 104 for execution or it may be sent to JIT buffer 204 for storage until native executable code 308 is to be executed by processor 104 on handheld device 200. Performing the JIT compilation on trusted server 302 frees up the limited resources on handheld device 200 that would be used by virtual machine 202 and JIT buffer 204 if the compilation were to be done on handheld device 200. This enables JIT'ting on handheld device 200 to be optional.

Figure 4A:
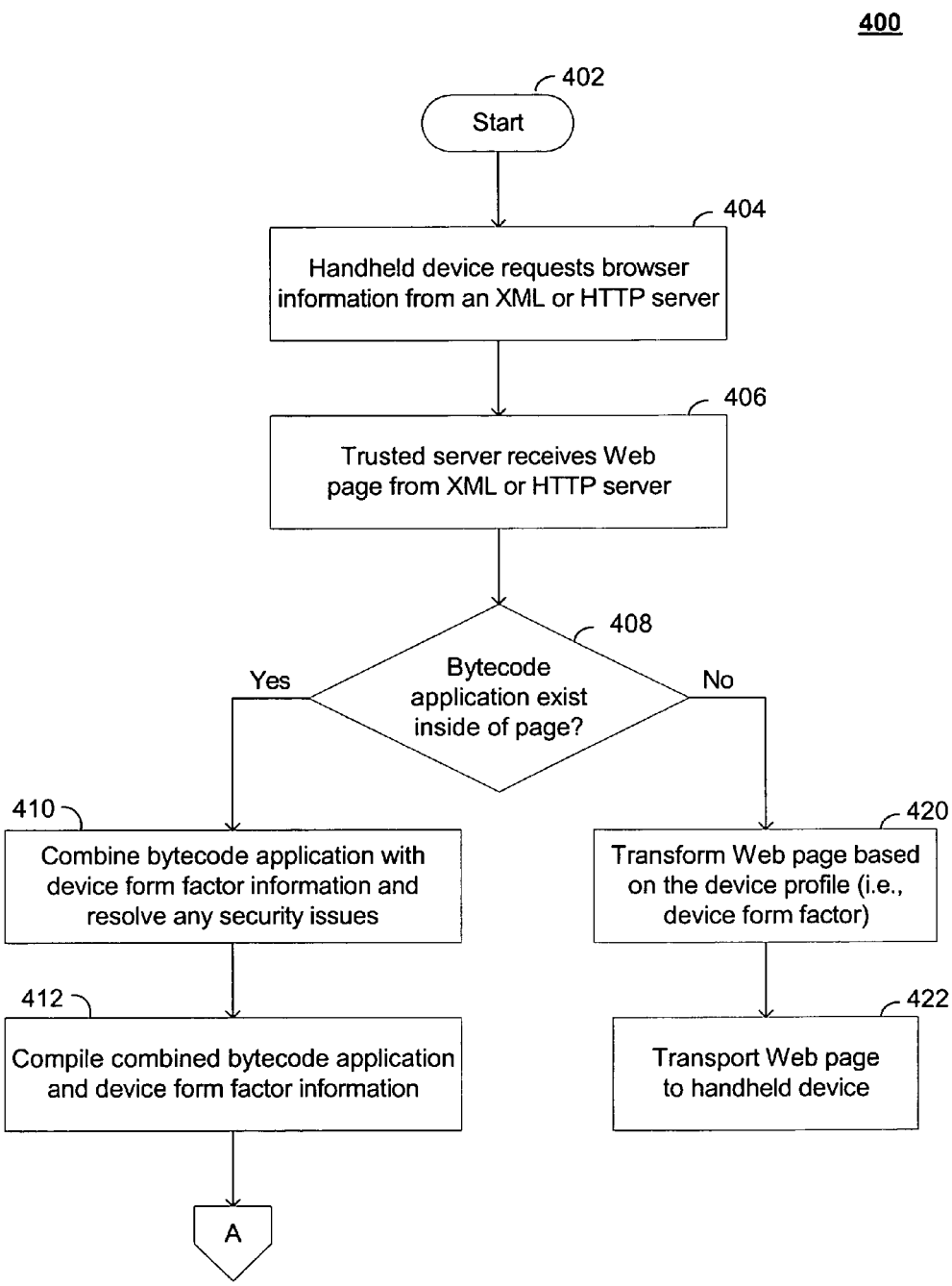
FIGS. 4A and 4B are a flow diagram describing an exemplary method for offloading resource intensive compiling of bytecode from a resource constrained device performing Web browsing according to an embodiment of the present invention.
Figure 4B:
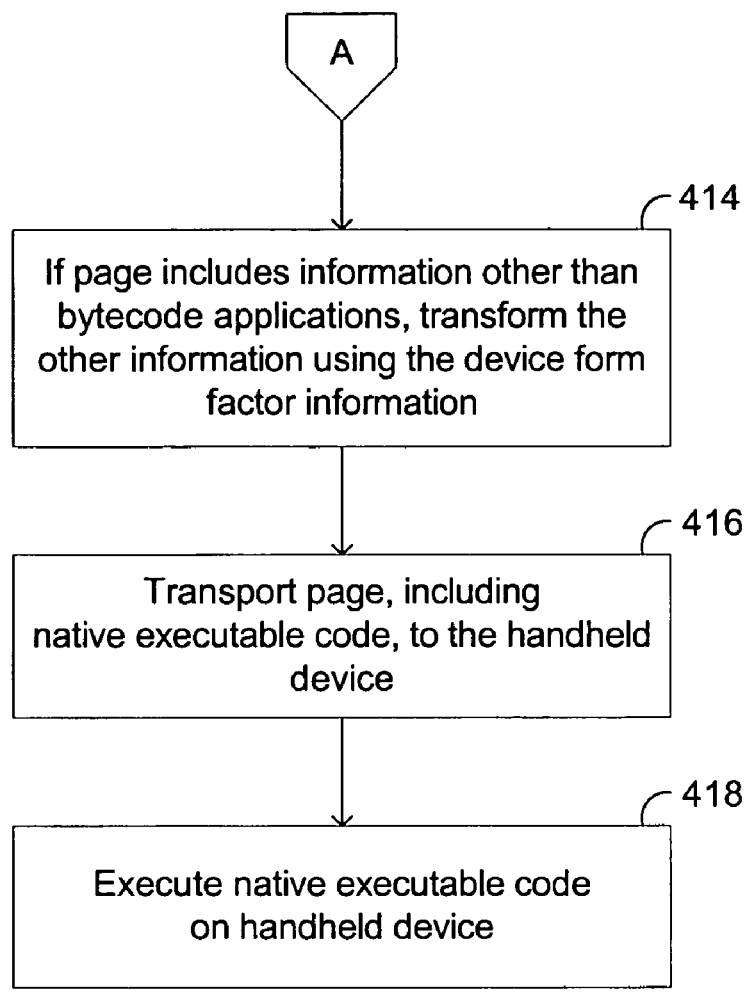

FIGS. 4A and 4B are a flow diagram 400 describing an exemplary method for offloading resource intensive compiling of bytecode from a resource constrained device performing Web browsing according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. While Web browsing is just one example of the types of functions performed by handheld device 200, one skilled in the relevant art(s) would know that other functions performed by handheld device 200 may also require the need to perform JIT compilations on bytecode applications. The process begins with block 402 in FIG. 4A, where the process immediately proceeds to block 404.

In block 404, a handheld device, such as, for example, handheld device 200, requests a page from an XML or HTML server. The XML or HTML server will send the page to the handheld device by way of a trusted server, such as, for example, trusted server 302 in block 406.

In decision block 408, it is determined by the trusted server whether the page includes any byte code applications. If it is determined that the page includes bytecode applications. The process proceeds to block 410.

In block 410, the bytecode applications are combined with device form factor information and any security issues are resolved. The combined byte code applications and device form factor information are compiled into bytecode and JIT compiled into native executable code for execution on the handheld device in block 412.

Referring now to block 414 in FIG. 4B, in an embodiment where the page includes information other than bytecode applications, the other information is transformed using the device form factor for the handheld device as well.

In block 416, the Web page, including the native executable code, is transported to the handheld device. In one embodiment, the Web page and the native executable code is transported to the handheld device via an RDMA/SOAP mechanism for execution on the handheld device. In another embodiment, the Web page is sent to the handheld device via traditional HTTP (HyperText Transfer Protocol) over TCP/IP (Transmission Control Protocol/Internet Protocol) methods and the native executable code is transported to the handheld device via the RDMA/SOAP mechanism for execution on the handheld device.

In block 418, any native executable code is executed on the handheld device.

Returning to decision block 408 in FIG. 4A, if it is determined that the page does not contain any bytecode applications, the process proceeds to block 420. In block 420, the page is transformed, based on the device form factor.

In block 422, the transformed Web page is transported to the handheld device via the RDMA/SOAP mechanism. In one embodiment, the transformed Web page may be sent to the handheld device using traditional HTTP over TCP/IP methods.

Note that in a "pure" bytecode application to native code application, the bytecode application would be sent to the handheld via a trusted server and the trusted server would combine the bytecode with device form factor information and compile the bytecode into native executable code for execution on the handheld device. The native executable code would be transported to the handheld device using the RDMA/SOAP mechanism.

RDMA (Remote Direct Memory Access) is the ability of one computer to directly place information in another computer's memory with minimal demands on memory bus bandwidth and processor processing overhead, while preserving memory protection semantics. RDMA over TCP/IP defines the interoperable protocols to support RDMA operations over standard TCP/IP networks. The demand for networking bandwidth and increases in network speeds are growing faster than the processing power and memory bandwidth of the compute nodes that ultimately must process the networking traffic. RDMA over TCP/IP addresses these issues in two important ways. First, much of the overhead of protocol processing can be moved to an Ethernet adapter. Second, each incoming network packet has enough information to allow it to be placed directly into final destination memory addresses. The direct data placement property of RDMA eliminates intermediate memory copies and associated demands on the memory and processor resources of the compute nodes. Binding SOAP to RDMA allows intelligent network interface cards (NICs) to enter into a more robust-infrastructure, while offloading the overhead of the network to buffer copying from the handheld device processor.

Figure 5:
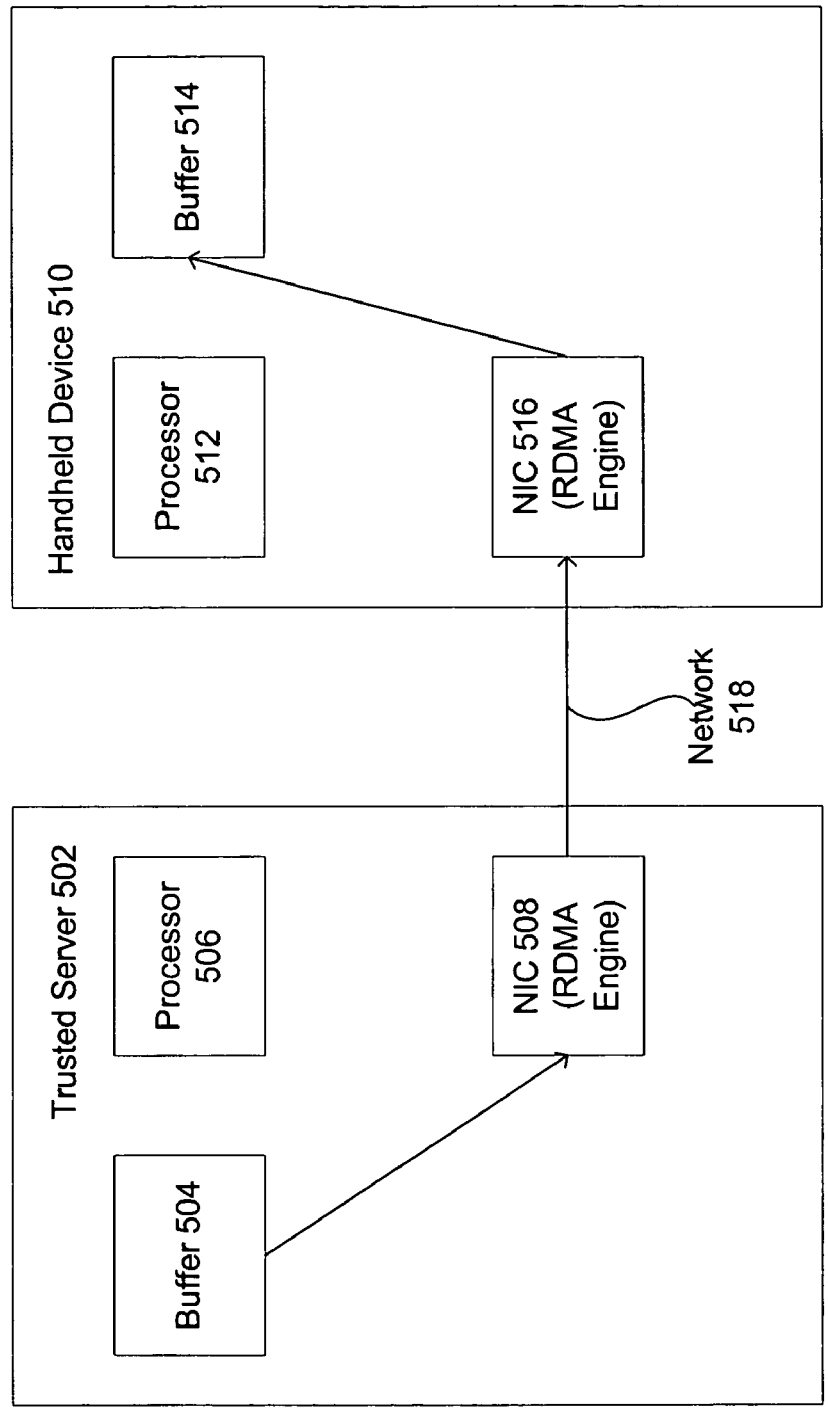
FIG. 5 is a diagram illustrating an exemplary transport mechanism using RDMA/SOAP in accordance with an embodiment of the present invention.

FIG. 5 is a diagram 500 illustrating an exemplary transport mechanism using RDMA/SOAP in accordance with an embodiment of the present invention. Diagram 500 shows a trusted server 502 transporting data to a handheld device 510 over a network 518. Trusted server 502 comprises, inter alia, a buffer 504, a processor 506, and a network interface card (NIC) 508. Buffer 504 is coupled to NIC 508. Handheld device 510 comprises, inter alia, a processor 512, a buffer 514, and a NIC 516. NIC 516 is coupled to buffer 514. Both NICs 508 and 516 include an RDMA engine. The RDMA engine includes RDMA/SOAP programmed logic. The SOAP binding to the RDMA protocol enhances the limited routing/messaging capabilities of RDMA by capitalizing on the Web Service Routing standard.

Buffer 504 contains the native executable code. Buffer 504 bypasses processor 506 and sends the native executable code to NIC 508. The data, which is in network packet form, has enough information to know where the data is to be transported to and where the data is to be placed in memory to allow the data to be placed directly into its final destination memory address. The data is then transported over network 518 to handheld device 510, where it is accepted by NIC 516. As previously indicated, NIC 516 includes RDMA/SOAP logic that enables the data to be routed directly to its final destination memory address. Therefore, utilizing RDMA/SOAP, the data is sent directly to buffer 514 and placed in memory using its final destination memory address, thereby bypassing processor 512. The direct data placement property of RDMA eliminates intermediate memory copies and associated demands on the memory and processor resources of trusted server 502 and handheld device 510. Thus, the RDMA/SOAP approach is used to off-load application overhead from processors onto NICs to share the increased network bandwidth load.

Figure 6:
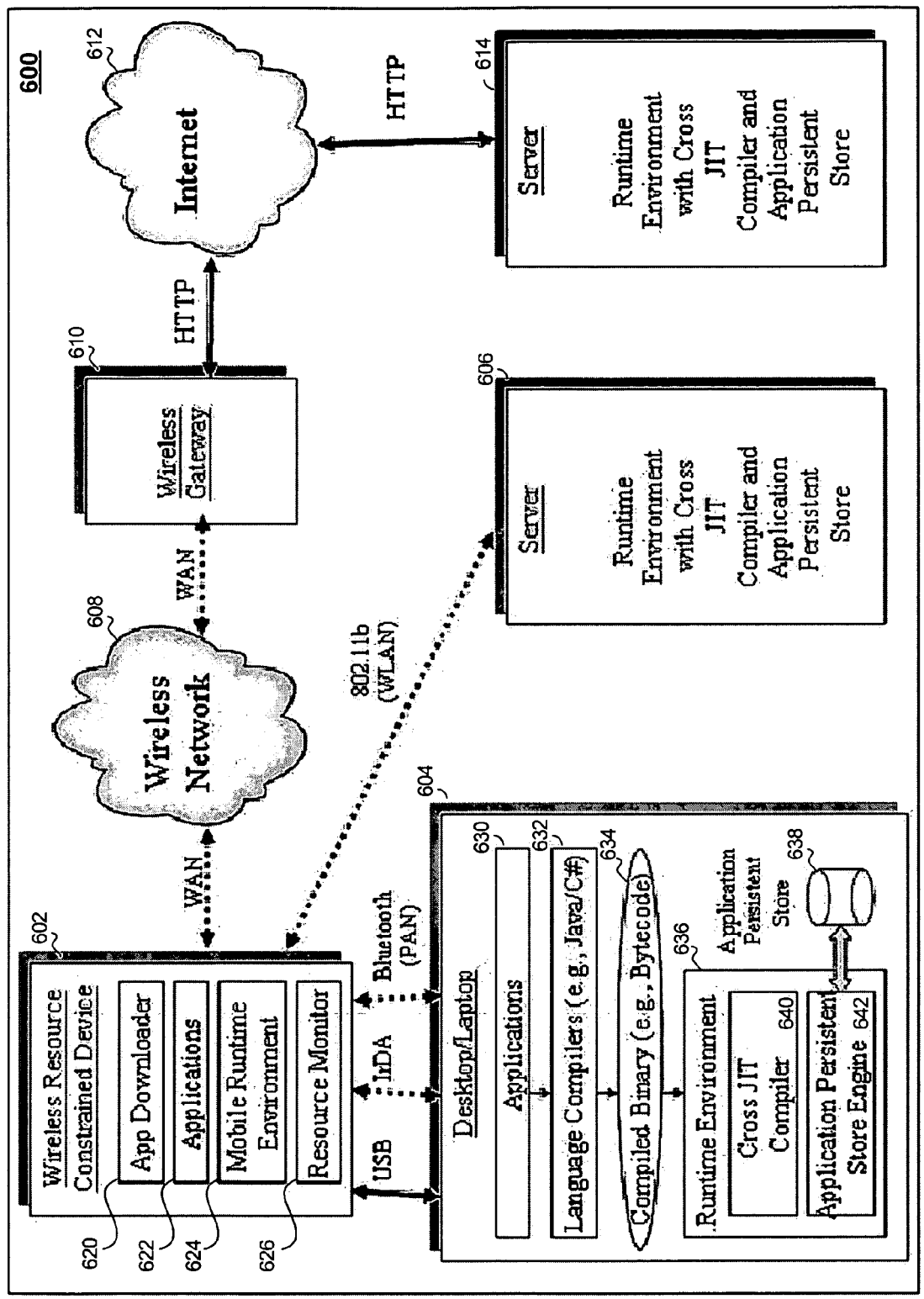
FIG. 6 is a diagram illustrating an exemplary resource constrained device in which resources are intelligently monitored to determine whether bytecode applications should be downloaded from other external computing devices, such as a trusted server, desktop, or laptop computer according to an embodiment of the present invention.

In one embodiment of the present invention, the resource constraints on a handheld device are monitored and if the resources are limited, platform independent code (i.e., bytecode applications) may be offloaded to a server, desktop, laptop, or other computing device rich in resources to handle the JIT processing. FIG. 6 is a diagram 600 illustrating an exemplary resource constrained device in which resources are intelligently monitored to determine whether bytecode applications should be downloaded from other external computing devices, such as a trusted server, desktop, or laptop computer according to an embodiment of the present invention. Diagram 600 comprises a wireless resource constrained device 602, a desktop/laptop computing device 604, a trusted server 606, a wireless network 608, a wireless gateway 610, the Internet 612, and an HTTP server 614. Wireless resource constrained device 602 is coupled to wireless network 608 via a wide-area-network (WAN). Wireless resource constrained device 602 is coupled to desktop/laptop computing device 604 via one or more of USB, IrDA, Bluetooth, etc. and to trusted server 606 via 802.11b using a wireless local area network (WLAN). Wireless network 608 is coupled to wireless-gateway 610 via a WAN. Wireless gateway 610 is coupled to Internet 612 using HTTP and Internet 612 is coupled to HTTP server 614 using HTTP.

Wireless resource constrained device 602 may be a handset, a PDA, a smart phone, etc. Each type of these devices is relatively resource constrained in terms of available memory (both static and dynamic), processing power, persistent store, etc. Wireless resource constrained device 602 comprises an application downloader 620, applications 622, mobile runtime environment (or virtual machine) 624, and a resource monitor 626.

Application downloader 620 provides the capability to download user specified applications from desktop/laptop computing device 604, trusted servers 606 and 614, or any other computing device capable of performing JIT compilations. Applications 622 houses applications that are downloaded by application download 620.

Mobile runtime environment 624 may be used to run the applications that are downloaded from external computing systems, such as desktops, laptops, and servers on a local intranet, such as server 606, or servers on the Internet, such as server 614 on Internet 612. Once applications are downloaded via application downloader 620, wireless device owners can run the applications under the mobile runtime environment on the device, such as mobile runtime environment 624 on wireless resource constrained device 602. Based on the types of resource constrained devices, the capabilities offered by the runtime environment may vary widely. For example, the runtime environment on a handset device may only support an interpreter for platform independent code, while a high-end PDA device may support a full-fledged JIT compiler in the runtime environment.

Mobile runtime environment 624 also makes intelligent decisions, based on the processing power of wireless resource constrained device 602, as to whether the entire application should be downloaded and run under mobile runtime environment 624 or whether to request selective native code for the application from a pre-determined trusted server. If wireless resource constrained device 602 has sufficient memory (both static and dynamic) and processing power, then the entire application may be downloaded and run under mobile runtime environment 624. Mobile runtime environment 624 will load the application from applications 622 into its memory, interpret the IL code or JIT compile the IL code to generate native code instructions appropriate for wireless resource constrained device 602 and then execute the resulting native code. If wireless resource constrained device 602 does not have the full processing power to generate native code for the downloaded application on the fly, then mobile runtime environment 624 may decide to request selective native code for the application from a trusted server, such as server 606 or server 614. Mobile runtime environment may also decide to request selective native code from desktop/laptop computing device 604.

Resource monitor 626 aids the decision making process performed by mobile runtime environment 624 by dynamically determining the available resources, such as dynamic memory, processor load, available network bandwidth, etc., for wireless resource constrained device 602. For example, based on the available processing capacity, mobile runtime environment 624 may download only the platform independent code rather than the native code. Alternatively, mobile runtime environment 624 may download native code for the application. In one embodiment, mobile runtime environment 624 may download native code for the application in a piecemeal approach as the application executes on the device. Mobile runtime environment 624 uses an internal in-memory cache (not shown) for downloaded native code so that this piece of code can be reused, for example, if the same method is called again.

Desktop/laptop computing device 604 comprises applications 630, language compilers 632 that compile the platform independent code (e.g., JAVA™, C#, etc.) into compiled binary 634, such as, for example, bytecode, a runtime environment 636, and an application persistent store database 638. Applications 630 comprise applications to be compiled. Language compilers 632 compile the higher level languages, such as, for example, JAVA™ and C# into bytecode or IL.

Runtime environment 636 compiles the bytecode or intermediate language (IL) code into native code. Runtime environment 636 includes a cross JIT compiler 640 for compiling the bytecode or IL code into native code and an application persistent store engine 642 for organizing the storage of native code in application persistent store database 638. In one embodiment, application persistent store engine 642 may be implemented as a relational database and the application persistent store database may act as a central repository for application native code. All applications to be downloaded to wireless resource constrained device 602 must be available on application persistent store database 638. Runtime environment 636 does not run the resulting native code. The resulting native code is executed on wireless resource constrained device 602.

Figure 7:
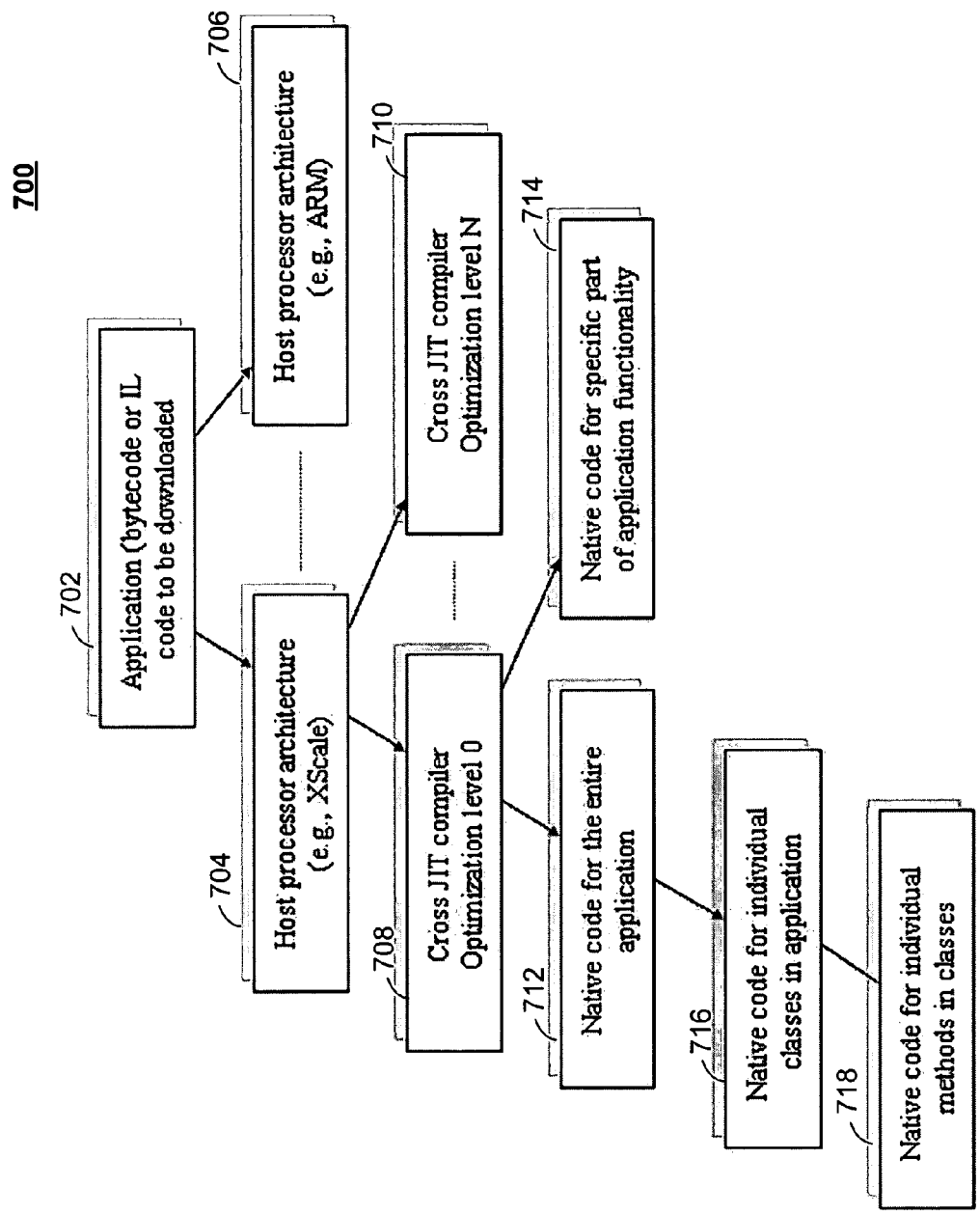
FIG. 7 is a diagram illustrating an exemplary application native code partitioning scheme according to an embodiment of the present invention.

Cross JIT compiler 640 may be configured to generate native code for different host processors, such as, for example, an Intel® XScale™ processor, an ARM (Advanced RISC Machine) processor (developed by ARM Holdings PLC), etc. Using cross JIT compiler 640, the native code generated for the end user application may be partitioned in several different ways. For example, the partitioning of native code generated for platform independent applications may be performed at different granularity levels, such as, but not limited to, application, class, method, or specific application functionality. One such partitioning scheme 700 is shown in FIG. 7. In partitioning scheme 700, an application 702 in bytecode or IL code to be downloaded to wireless resource constrained device 602 may be partitioned according to the device processor architecture (704 and 706). For example, Intel® XScale™ processor architecture requires additional instructions or instruction set than ARM processor architecture. The device processor architecture partition may be further partitioned according to optimization levels 0 . . . N, such as that shown in 708 and 710. Using cross JIT compiler 640, native code for the application can be generated at the application, class, or method levels and stored in application persistent store database 638. The native code for an entire application at certain optimization levels (e.g., 708) may be stored in application persistent store database 638 for downloading to wireless resource constrained device 602 as shown in 712 or a specific part of application functionality of the native code 714 may be stored in application persistent store database 638 for downloading to wireless resource constrained device 602. The native code for an entire application (e.g., 712) may be further partitioned into classes as shown in 716, and the classes 716 may be further partitioned into methods 718 for the classes 716. As cross JIT compiler 640 generates native code for methods, it interacts with persistent store engine 642 to organize and store the native code for the method in application persistent store database 638. Embodiments of the present invention may use one or more of the above partitioning schemes to partition an application's native code. The resulting sets of native code are then stored in application persistent store database 638.

Returning to FIG. 6, although not explicitly shown, servers 606 and 614 are comprised of the same components 630-642 as shown in desktop/laptop computing device 604. Servers 606 and 614 function in a similar manner as described above to download bytecode or native code to wireless resource constrained device 602.

Figure 8:
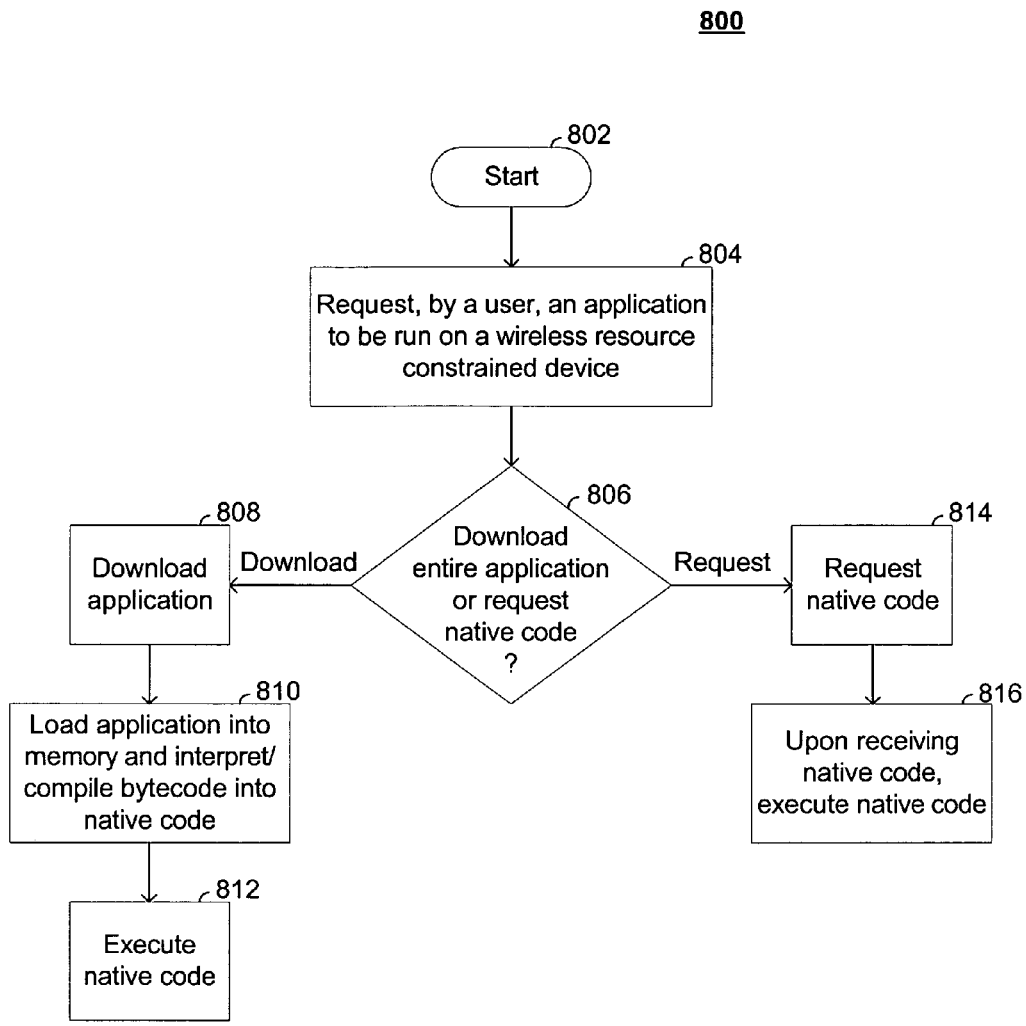
FIG. 8 is a flow diagram illustrating an exemplary method for intelligently and dynamically determining the resource constraints on a wireless resource constrained device for downloading and running platform independent code more efficiently in mobile runtime environments according to an embodiment of the present invention.

FIG. 8 is a flow diagram 800 illustrating an exemplary method for intelligently and dynamically determining the resource constraints on a wireless resource constrained device for downloading and running platform independent code more efficiently in mobile runtime environments according to an embodiment of the present invention. The invention is not limited to the embodiment described herein with respect to flow diagram 800. Rather, it will be apparent to persons skilled in the relevant art(s) after reading the teachings provided herein that other functional flow diagrams are within the scope of the invention. The process begins with block 802, where the process immediately proceeds to block 804.

In block 804, a user of a wireless resource constrained device requests an application from one of a trusted server or desktop/laptop computing device. The application may be platform independent application, such as JAVA™, C#, etc.

In decision block 806, mobile runtime environment 624 will determine whether to download the entire application and run the application under mobile runtime environment 624 or request native code for the application. Mobile runtime environment 624 will consult resource monitor 626 to determine the available resources of wireless resource constrained device 602. For example, if resource monitor 626 indicates that wireless resource constrained device 602 has sufficient memory, processing power, and network bandwidth, mobile runtime environment may decide to allow the entire application to be downloaded and run under mobile runtime environment 624. In another example, if resource monitor 626 indicates that wireless resource constrained device 602 has sufficient memory and processing power, but lacks enough bandwidth to download the entire application, then mobile runtime environment may decide to allow portion of the application to be downloaded and run under mobile runtime environment 624. Alternatively, mobile runtime environment 624 may decide to request native code for the application from one of desktop/laptop computing device 604 or trusted servers 606/614. Alternatively, mobile runtime environment 624 may decide to request selective native code for the application from one of desktop/laptop computing device 604 or trusted servers 606/614. In yet another example, if wireless resource constrained device 602 does not have the full processing power to generate native code for the application to be downloaded to be compiled on the fly, then mobile runtime environment 624 may decide to request selective native code for the application from one of desktop/laptop computing device 604 or trusted servers 606/614.

If mobile runtime environment 624 determines that the entire application can be downloaded and run on the fly under mobile runtime environment 624, the process proceeds to block 808.

In block 808, the application is downloaded from one of trusted servers 606 and 614 and desktop/laptop computing device 604. The process proceeds to block 810.

In block 810, mobile runtime environment 624 loads the application into its memory and interprets the bytecode or IL code or JIT compiles the bytecode or IL code to generate native code instructions appropriate for the processor of wireless resource constrained device 602.

In block 812, the native code instructions are executed.

Returning to decision block 806, if mobile runtime environment 624 determines that native code must be requested, the process proceeds to block 814.

In block 814, mobile runtime environment may request that native code from one of trusted servers 606 and 614 and desktop/laptop computing device 604 be downloaded to wireless resource constrained device 602. In one embodiment, mobile runtime environment 624 may request the download of the native code at the application level. In another embodiment, mobile runtime environment 624 may request the download of the native code at the class level or the method level. Alternatively, mobile runtime environment 624 may request the native code at a specific application functionality level. This granularity of application code can be selected dynamically to take advantage of the available network bandwidth.

In block 816, the requested native code is downloaded and executed on wireless resource constrained device 602.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor and a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for offloading resource intensive compilations comprising:
   requesting, by a user of a wireless handheld device, data including a platform independent application;
   assessing, by the wireless handheld device, a resource on the wireless handheld device and determining whether or not to request native code for the platform independent application; and
   if it is determined that the request for the native code should be made, the requested platform independent application is routed to a trusted server, wherein the trusted server compiles the platform independent application into the native code for the wireless handheld device and transports the native code to the wireless handheld device for execution on the wireless handheld device,
   wherein compiling the platform independent application into the native code comprises combining the platform independent application with device form factor information for the wireless handheld device, compiling the combined platform independent application into bytecode, and JIT (Just-In-Time) compiling the bytecode into the native code and if the data further includes information other than the platform independent application, then modifying the information other than the platform independent application using the device form factor information and transporting the modified information to the wireless handheld device.

2. The method of claim 1, wherein the bytecode is JIT (Just-In-Time) compiled into the native code using a JIT compiler with AoT (Ahead of Time) compilation.

3. The method of claim 1, wherein the platform independent application comprises a C# application.

4. The method of claim 1, wherein the platform independent application includes a bytecode application.

5. The method of claim 1, wherein the native code is transported to the wireless handheld device using RDMA/SOAP (Remote Direct Memory Access/Simple Object Access Protocol).

6. The method of claim 5, wherein transporting the native code to the wireless handheld device using RDMA/SOAP includes bypassing host processors on the trusted server and the wireless handheld device using network interface cards (NICs) that route the native code directly to a designated memory location on the wireless handheld device.

7. The method of claim 1, wherein the platform independent application is embedded in a Web page requested by the user and wherein the trusted server extracts the platform independent application from the Web page to compile the platform independent application.

8. The method of claim 1, wherein the native code is customized specifically for execution on the wireless handheld device using a device form factor of the wireless handheld device, wherein the device form factor of the wireless handheld device is stored on the trusted server.

9. The method of claim 1, wherein the native code is transported to the wireless handheld device using a wireless network protocol.

10. The method of claim 9, wherein the wireless network protocol comprises one of a USB (Universal Serial Bus), IrDA (Infrared Data Association), Bluetooth, 802.11b, and 2.5G/3G wide area networks.

11. The method of claim 1, wherein the device form factor information comprises a user preference for the wireless handheld device.

12. The method of claim 1, wherein the resource comprises one of processing power, memory, and network bandwidth.

13. The method of claim 1, wherein the information other than the platform independent application includes web data.

14. A method for offloading resource intensive compilations comprising:
   requesting, by a user of a wireless device, data including a platform independent application from one of a trusted server, a desktop computer, and a laptop computer;
   determining, by the wireless device, whether or not to download the platform independent application for running the platform independent application or request native code for the independent application, wherein the wireless device assesses a resource on the wireless device to make the determination;
   if it is determined that the resource is adequate to download and run the platform independent application on the wireless device, then downloading and running the platform independent application on the wireless device; and
   if it is determined that the resource is inadequate to download and run the platform independent application on the wireless device, then requesting the native code for the platform independent application from one of the trusted server, the desktop computer, and the laptop computer, where one of the trusted server, the desktop computer, and the laptop computer compiles the platform independent application into the native code for execution on the wireless device,
   wherein compiling the platform independent application into the native code comprises combining the platform independent application with device form factor information for the wireless device, compiling the combined platform independent application into bytecode, and JIT (Just-In-Time) compiling the bytecode into the native code, and
   if the data further includes information other than the platform independent application, then modifying the information other than the platform independent application using the device form factor information and transporting the modified information to the wireless device.

15. The method of claim 14, wherein downloading and running the platform independent application comprises:
   downloading the independent platform application; and
   interpreting bytecode from the independent platform application to generate native code appropriate for a processor of the wireless device to execute.

16. The method of claim 14, wherein downloading and running the platform independent application comprises:
   downloading the independent platform application; and
   JIT (Just-In-Time) compiling the independent platform application to generate native code appropriate for a processor of the wireless device to execute.

17. The method of claim 14, wherein the native code is appropriate for execution on a processor of the wireless device.

18. The method of claim 14, wherein requesting native code for the platform independent application comprises requesting partitioned native code, wherein the partitioned native code is partitioned by one of an application level, a class level, a method level, and a specific application functionality level.

19. The method of claim 14, wherein requesting native code for the platform independent application further comprises downloading the native code and executing the native code on the wireless device.

20. The method of claim 14, wherein the wireless device is a handheld device.

21. The method of claim 14, wherein the wireless device is a resource constrained wireless device.

22. The method of claim 14, wherein the trusted server, the desktop computer, and the laptop computer include a cross JIT (Just-In-Time) compiler configured to generate native code for a plurality of different processors used on different wireless devices.

23. The method of claim 14, wherein the trusted server, the desktop computer, and the laptop computer include an application persistent store for storing native code for a plurality of platform independent applications that are downloaded in native code to different wireless devices.

24. The method of claim 14, wherein the device form factor information comprises a user preference for the wireless handheld device.

25. The method of claim 14, wherein the resource comprises one of processing power, memory, and network bandwidth.

26. The method of claim 14, wherein the information other than the platform independent application includes web data.

27. An article comprising: a machine readable device to store a plurality of machine accessible instructions executable by a processor, the instructions provide for:
  requesting, by a user of a wireless handheld device, data including a platform independent application;
  assessing, by the wireless handheld device, a resource on the wireless device and determining whether or not to request native code for the platform independent application; and
  if it is determined that a request for the native code should be made, enabling the requested platform independent application to be routed to a trusted server, wherein the trusted server compiles the platform independent application into the native code for the wireless handheld device and transports the the native code to the wireless handheld device for execution on the wireless handheld device,
  wherein compiling the platform independent application into the native code comprises combining the platform independent information with device form factor information for the wireless handheld device, compiling the combined platform independent application into bytecode, and JIT (Just-In-Time) compiling the bytecode into the native code and if the data further includes information other than the platform independent application, then modifying the information other than the platform independent application using the device form factor information and transporting the modified information to the wireless handheld device.

28. The article of claim 27, wherein the bytecode is JIT (Just-In-Time) compiled into the native code using a JIT compiler with AoT (Ahead of Time) compilation.

29. The article of claim 27, wherein the platform independent application comprises a C# application.

30. The article of claim 27, wherein the platform independent application includes a bytecode application.

31. The article of claim 27, wherein the native code is transported to the wireless handheld device using RDMA/SOAP (Remote Direct Memory Access/Simple Object Access Protocol).

32. The article of claim 31, wherein instructions for transporting the native code to the wireless handheld device using RDMA/SOAP includes instructions for bypassing host processors on the trusted server and the wireless handheld device using network interface cards (NICs) that route the native code directly to a designated memory location on the wireless handheld device.

33. The article of claim 27, wherein the platform independent application is embedded in a Web page requested by the user and wherein the trusted server extracts the platform independent application from the Web page to compile the platform independent application.

34. The article of claim 27, wherein the native code is customized specifically for execution on the wireless handheld device using a device form factor of the wireless handheld device, wherein the device form factor of the wireless handheld device is stored on the trusted server.

35. The article of claim 27, wherein the native code is transported to the wireless handheld device using a wireless network protocol.

36. The article of claim 35, wherein the wireless network protocol comprises one of a USB (Universal Serial Bus), IrDA (Infrared Data Association), Bluetooth, 802.11b, and 2.5G/3G wide area networks.

37. The article of claim 27, wherein the device form factor information comprises a user preference for the wireless handheld device.

38. The article of claim 27, wherein the resource comprises one of processing power, memory, and network bandwidth.

39. The method of claim 27, wherein the information other than the platform independent application includes web data.

40. An article comprising: a machine readable device to store a plurality of machine accessible instructions executable by a processor, the instructions provide for:
  requesting, by a user of a wireless device, data including a platform independent application from one of a trusted server, a desktop computer, and a laptop computer;
  determining, by the wireless device, whether or not to download the platform independent application for running the platform independent application or request native code for the independent application, wherein the wireless device assesses a resource on the wireless device to make the determination;
  if it is determined that the resource is adequate to download and run the platform independent application on the wireless device, then downloading and running the platform independent application on the wireless device; and
  if it is determined that the resource is inadequate to download and run the platform independent application on the wireless device, then requesting the native code for the platform independent application from one of the trusted server, the desktop computer, and the laptop computer, where one of the trusted server, the desktop computer, and the laptop computer compiles the platform independent application into the native code for execution on the wireless device,
  wherein compiling the platform independent application into the native code comprises combining the platform independent application with device form factor information for the wireless device, compiling the combined platform independent application into bytecode, and JIT (Just-In-Time) compiling the bytecode into the native code, and if the data further includes information other than the platform independent application, then modifying the information other than the platform independent application using the device form factor information and transporting the modified information to the wireless device.

41. The article of claim 40, wherein instructions for downloading and running the platform independent application comprises instructions for:

downloading the independent platform application; and interpreting bytecode from the independent platform application to generate native code appropriate for a processor of the wireless device to execute.

42. The article of claim 40, wherein instructions for downloading and running the platform independent application comprises instructions for:

downloading the independent platform application; and

JIT (Just-In-Time) compiling the independent platform application to generate native code appropriate for a processor of the wireless device to execute.

43. The article of claim 40, wherein the native code is appropriate for execution on a processor of the wireless device.

44. The article of claim 40, wherein instructions for requesting the native code for the platform independent application comprises instructions for requesting partitioned native code, wherein the partitioned native code is partitioned by one of an application level, a class level, a method level, and a specific application functionality level.

45. The article of claim 40, wherein instructions for requesting the native code for the platform independent application further comprises instructions for downloading the native code and executing the native code on the wireless device.

46. The article of claim 40, wherein the wireless device is a handheld device.

47. The article of claim 40, wherein the wireless device is a resource constrained wireless device.

48. The article of claim 40, wherein the trusted server, the desktop computer, and the laptop computer include a cross JIT (Just-In-Time) compiler configured to generate native code for a plurality of different processors used on different wireless devices.

49. The article of claim 40, wherein the trusted server, the desktop computer, and the laptop computer include an application persistent store for storing native code for a plurality of platform independent applications that are downloaded in native code to different wireless devices.

50. The article of claim 40, wherein the device form factor information comprises a user preference for the wireless handheld device.

51. The article of claim 40, wherein the resource comprises one of processing power, memory, and network bandwidth.

52. The method of claim 40, wherein the information other than the platform independent application includes web data.

* * * * *